US009447225B2

(12) United States Patent
Tabor et al.

(10) Patent No.: US 9,447,225 B2
(45) Date of Patent: Sep. 20, 2016

(54) POLYESTER POLYOLS CONTAINING DIELS-ALDER OR ENE ADDUCTS

(71) Applicant: Stepan Company, Northfield, IL (US)

(72) Inventors: Rick Tabor, Plymouth, MI (US); Chunhua Yao, Carmel, IN (US); Andrew Guo, Wilmette, IL (US); Timothy L. Lambert, Lindenhurst, IL (US); David J. Norberg, Grayslake, IL (US)

(73) Assignee: Stepan Company, Northfield, IL (US)

( * ) Notice: Subject to any disclaimer, the term of this patent is extended or adjusted under 35 U.S.C. 154(b) by 7 days.

(21) Appl. No.: 14/334,203

(22) Filed: Jul. 17, 2014

(65) Prior Publication Data

US 2014/0378570 A1 Dec. 25, 2014

Related U.S. Application Data

(63) Continuation of application No. PCT/US2013/022068, filed on Jan. 18, 2013.

(60) Provisional application No. 61/587,778, filed on Jan. 18, 2012.

(51) Int. Cl.

| C08G 18/68 | (2006.01) |
| C08G 63/553 | (2006.01) |
| C08G 18/08 | (2006.01) |
| C08G 18/72 | (2006.01) |
| C08G 63/672 | (2006.01) |
| C08G 18/76 | (2006.01) |
| C08G 18/16 | (2006.01) |
| C08G 18/18 | (2006.01) |
| C08G 18/22 | (2006.01) |
| C08G 18/24 | (2006.01) |
| C09D 175/04 | (2006.01) |
| C08G 18/40 | (2006.01) |
| C08J 9/02 | (2006.01) |
| C08J 9/14 | (2006.01) |
| C08G 101/00 | (2006.01) |

(52) U.S. Cl.
CPC ............ *C08G 18/686* (2013.01); *C08G 18/14* (2013.01); *C08G 18/163* (2013.01); *C08G 18/1808* (2013.01); *C08G 18/1825* (2013.01); *C08G 18/225* (2013.01); *C08G 18/244* (2013.01); *C08G 18/4018* (2013.01); *C08G 18/68* (2013.01); *C08G 18/72* (2013.01); *C08G 18/7664* (2013.01); *C08G 63/553* (2013.01); *C08G 63/672* (2013.01); *C08J 9/02* (2013.01); *C08J 9/141* (2013.01); *C09D 175/04* (2013.01); *C08G 2101/005* (2013.01); *C08G 2101/0008* (2013.01); *C08G 2101/0025* (2013.01); *C08G 2105/02* (2013.01); *C08G 2190/00* (2013.01); *C08J 2203/14* (2013.01); *C08J 2205/06* (2013.01); *C08J 2205/10* (2013.01); *C08J 2375/06* (2013.01); *C08J 2375/14* (2013.01)

(58) Field of Classification Search
None
See application file for complete search history.

(56) References Cited

U.S. PATENT DOCUMENTS

| 2,491,409 A | 12/1949 | Kropa et al. | |
| 3,252,924 A | 5/1966 | Merten et al. | |
| 3,546,153 A | 12/1970 | Mellan et al. | |
| 3,775,152 A * | 11/1973 | Jacoby | G03C 1/93 430/533 |
| 4,147,675 A * | 4/1979 | Aritomi | C08G 63/20 525/7 |
| 4,508,767 A * | 4/1985 | Hokamura | B05D 7/574 427/386 |
| 5,075,417 A | 12/1991 | Trowell et al. | |
| 2004/0158003 A1 | 8/2004 | Ruckel et al. | |
| 2010/0222541 A1 | 9/2010 | Zupancic | |
| 2010/0234482 A1 | 9/2010 | Du Prez et al. | |
| 2011/0218264 A1 | 9/2011 | Casati et al. | |

FOREIGN PATENT DOCUMENTS

| GB | 1050642 | 12/1966 | |
| WO | WO2008/101722 | 8/2008 | |
| WO | WO 2010057100 A2 * | 5/2010 | ............. C08G 18/36 |

OTHER PUBLICATIONS

Owen, R. W.; Mier, W.; Giacosa, A.; Hull, W. E.; Spiegelhalder, B.; Bartsch, H. Phenolic compounds and squalene in olive oils: the concentration and antioxidant potential of total phenols, simple phenols, secoiridoids, lignans and squalene. Food and Chemical Technology, 2000, vol. 38, pp. 647-659.*
Sunflower Oil Technical Datasheet. McKinley Resources. http://raw-materials.mckinleyresources.com/Asset/Sunflower-Oil--TDS.pdf. As viewed on Oct. 6, 2015.*
Keeling, C. I.; Bohlmann, J. Diterpene resin acids in conifers. Phytochemistry, 2006, vol. 67, pp. 2415-2423.*
Definition of glycol. http://www.thefreedictionary.com/glycol. As viewed on Oct. 6, 2015.*
DuPont Zonyl Fluoroadditives for Coatings. E.I. du Pont de Nemours and Company. 2003.*
Zonyl FSO Fluorosurfactant Information. Sigma-Aldrich. http://www.sigmaaldrich.com/catalog/product/aldrich/421448?lang=en&region=US. As viewed on Feb. 25, 2016.*
International Search Report and Written Opinion dated Mar. 29, 2013 for PCT Application No. PCT/US2013/022068 filed Jan. 18, 2013.
European Patent Office, Communication with extended European search report, in Application No. 13738070.5, dated Aug. 12, 2015 (5 pages).

* cited by examiner

*Primary Examiner* — Robert C Boyle
*Assistant Examiner* — Stephen Rieth
(74) *Attorney, Agent, or Firm* — McAndrews, Held & Malloy, Ltd.

(57) ABSTRACT

Polyester polyols containing adducts formed from Diels-Alder and Ene reactions are disclosed. Processes for making the polyester polyols and uses of the polyester polyols as polyurethane coatings, adhesives, sealants, elastomers, and foams are also disclosed. In some embodiments, the polyester polyols contain biorenewable adducts based on maleic anhydride and farnesene and have particular application in making rigid and flexible polyurethane or polyisocyanurate foams.

7 Claims, No Drawings

POLYESTER POLYOLS CONTAINING DIELS-ALDER OR ENE ADDUCTS

RELATED APPLICATIONS

This application claims priority to, and is a continuation of, International application No. PCT/US2013/022068 (International Publication No. WO 2013/109834) having an International filing date of Jan. 18, 2013. This PCT application claims priority to and claims benefit from U.S. provisional Application No. 61/587,778, having a filing date of Jan. 18, 2012. The entire specifications of the PCT and provisional applications referred to above are hereby incorporated by reference.

BACKGROUND OF THE INVENTION

The use of biorenewable components as substitutes, either in whole or in part, for petrochemical derived raw materials is an emerging trend in the chemical industry. At least one benefit includes the use of a raw material that is non-depleting of fossil resources (i.e., renewable), and in some cases a reduction in lifecycle global warming potential due to the fixation of $CO_2$ in plant biomass from which the biorenewable materials are derived.

Biorenewable raw materials are typically either carbohydrate based or natural oil based. Prior to their end-use as polyols, the biorenewable raw material may or may not undergo further chemical transformation, with or without other petrochemical based materials.

There are challenges to the use of natural oils as raw materials for polyols to be used in isocyanate based foam products (e.g., polyurethanes and polyisocyanurates). The natural oils, with the exception of those oils having hydroxyl functionality (e.g. castor oil, or lesquerella oil), typically lack isocyanate reactive functionality, and must undergo chemical transformation, such as, for example, transesterification with functionalized materials, epoxidation and ring opening, oxidation, ozonolysis, or hydroformylation to add reactive functionality. The added reactive functionality could be any active hydrogen moiety, and is typically hydroxyl groups or amines.

The properties (e.g., compressive strength, green strength, reactivity, thermal stability) of resultant foams formed from the reaction of functionalized natural oils with isocyanate are often deteriorated relative to foams made solely from petrochemical polyols, aromatic polyester polyols in particular. This deterioration of foam properties can be due, at least in part, to the plasticization of the foam by the relatively high aliphatic concentration of the natural oils. The deterioration of foam properties can also be due, at least in part, to the poor reactivity of the functional group due to steric hindrance by the aliphatic chains of the oil, and the incompatibility of the natural oil polyol with the isocyanate. The deterioration of foam properties can also be due to the functionality reduction to the polyester polyol by the end capping action of fatty acids.

Also, when natural oils are used in combination with petrochemical polyols, the natural oil is frequently not compatible with the petrochemical polyol, which again results in the deterioration of foam properties. This is often the case with aromatic polyester polyols, and compatibility becomes an important issue for the end user who must blend and use (e.g., mix with an isocyanate) the polyol before its separation into component parts.

Polyester polyols are also utilized in polyurethane non-foam applications, such as in coatings, adhesives, sealants and elastomers (CASE) applications. Using biorenewable materials in polyester polyols for CASE applications presents the same challenges with respect to isocyanate reactivity and petrochemical compatibility as presented in polyurethane and polyisocyanurate foam applications. With elastomers, the loss of functionality can cause a loss of hysteresis, fatigue and creep properties. In the case of coatings, chain termination and subsequent loss of polymer network formation can result in a loss of toughness and durability.

There is still a need for polyester polyol compositions containing biorenewable components, which can be used to make polyurethane and polyisocyanurate foams, such as pentane blown foams, having good foam strength, flammability resistance and insulation characteristics. Desirably, these polyol compositions should maintain pentane compatibility, have a good reactivity profile, mix well with isocyanate, and minimally deteriorate the physical and thermal properties of the resultant foams. There is also a need for improved polyester polyol compositions containing biorenewable components which can be used in CASE applications and flexible foams.

BRIEF SUMMARY OF THE INVENTION

The present technology relates to polyester polyols containing Diels-Alder or Ene adducts.

In some embodiments, the Diels-Alder adducts are prepared by reacting an unsaturated carboxylic acid or its anhydride as a dienophile with a diene selected from the group consisting of terpenes, and low molecular weight dienes, including but not limited to, for example, butadiene and cyclopentadiene. In some embodiments, the Diels-Alder adducts are prepared by reacting maleic anhydride or itaconic anhydride with farnesene.

In further embodiments, the Ene adducts are prepared by reacting an unsaturated carboxylic acid or its anhydride as an enophile with an Ene selected from alpha-olefins, natural oils with unsaturation, unsaturated fatty acids and their methyl esters.

The present technology is also directed to a process of making the polyester polyol compositions of the present technology. In one embodiment, the polyester polyols of the present technology can be made by making the Diels-Alder or Ene adduct and then esterifying the adduct into the polyester polyol. In another embodiment, the polyester polyols of the present technology can be made by reacting the dienophile, such as maleic anhydride, with the polyol components, such as phthalic anhydride and diethylene glycol, to make a base polyol, and then incorporating the diene or Ene through a Diels-Alder or Ene reaction. In a still further embodiment, the polyester polyols of the present technology can be prepared by reacting the diene and dienophile together with, for example, diethylene glycol in a Diels-Alder reaction, and then esterifying the reaction product with, for example, phthalic anhydride.

In at least one embodiment, the present technology provides a polyester polyol that contains about 25% or more biorenewable content.

In another embodiment, the present technology provides a foam that contains about 8% or more biorenewable content, alternatively about 7.5% or more biorenewable content.

The polyester polyols of the present technology comprise aromatic and/or aliphatic polyester polyols, which can be used in any area in which polyol use is needed including, but not limited to, polyurethane coatings, adhesives, sealants, elastomers, and foams. In certain particular embodiments, the polyester polyols of the present technology are used in preparing rigid polyurethane or polyisocyanurate foams. In other particular embodiments, the polyester polyols of the present technology are used in preparing flexible polyurethane foams. In still other embodiments, the polyester polyols of the present technology can be used in CASE applications.

In an additional embodiment, the present technology provides a method of preparing polyols for use in the production of urethane modified polyisocyanurate foams with superior green strength, compressive strength, dimensional stability, flammability performance, friability, and K factor foam performances.

In a further embodiment the present technology provides a composition comprising a polyester polyol wherein the polyester polyol comprises (a) at least one aromatic acid based material, or at least one aliphatic carboxylic acid based material, or a mixture thereof; (b) at least one hydroxylated material; and (c) at least one adduct formed by a Diels-Alder reaction of a diene and a dienophile or an Ene reaction of an Ene and an enophile.

A still further embodiment of the present technology provides a process for producing a polyester polyol that comprises a Diels-Alder or Ene adduct comprising:
  reacting
    (i) at least one aromatic acid based material, or at least one aliphatic carboxylic acid based material, or mixtures thereof;
    (ii) at least one hydroxylated material;
    (iii) at least one diene or Ene component; and
    (iv) at least one dienophile or enophile component,
wherein the diene or Ene component reacts with the dienophile or enophile component by a Diels-Alder or Ene reaction to form the adduct.

An additional embodiment of the present technology provides a foam forming composition comprising at least one diisocyanate component, at least one polyisocyanate component, or mixtures thereof, and at least one polyester polyol component comprising:
  (i) at least one aromatic acid based material, or at least one aliphatic carboxylic acid based material, or mixtures thereof;
  (ii) at least one hydroxylated material; and
  (iii) at least one adduct formed by a Diels-Alder reaction of a diene and a dienophile or an Ene reaction of an Ene and an enophile.

BRIEF DESCRIPTION OF SEVERAL VIEWS OF THE DRAWINGS

[Not Applicable]

DETAILED DESCRIPTION OF THE INVENTION

The present technology provides a new approach for incorporating material, particularly biorenewable material, into polyester polyols used for polyurethane and polyisocyanurate applications. This approach comprises incorporating a Diels-Alder or Ene adduct made from a diene or Ene component, preferably from a biorenewable source, into the polyester polyol to form a polyester polyol containing the biorenewable material.

The polyester polyols of the present technology are prepared by reacting (a) aromatic acid-based and/or aliphatic carboxylic acid-based material, (b) hydroxylated material, (c) a dienophile or enophile component selected from unsaturated aliphatic carboxylic acid or its anhydride, and (d) a diene or Ene component selected from terpenes, low molecular weight dienes, alpha-olefins, natural oils with unsaturation, and fatty acids and their methyl esters with unsaturation, wherein the diene or Ene component reacts with the unsaturated carboxylic acid or anhydride by a Diels-Alder or Ene reaction.

The aromatic acid-based material can be, for example, phthalic acid based material, phthalic acid or a derivative of phthalic acid. Examples of phthalic acid based materials include, for example, various phthalic acids such as terephthalic acid and isophthalic acid, phthalic anhydride, dimethyl terephthalate, dimethyl phthalate, dimethyl isophthalate, polyethylene terephthalate, benzoic acid, methyl benzoate, methyl toluate, toluic acid, 2,5-furandicarboxylic acid, trimellitic anhydride, derivatives thereof, and combinations thereof. The phthalic acid based materials for use in preparing the polyester polyols can be (a) substantially pure phthalic acid or phthalic acid derivatives, such as phthalic anhydride, terephthalic acid, methyl terephthalate, isophthalic acid, and trimellitic anhydride; or (b) somewhat complex mixtures such as side stream, waste or scrap products containing residues of phthalic acid. In this context, "residues of phthalic acid" means any reacted or unreacted phthalic acid remaining in a product after its manufacture by a process in which phthalic acid or a derivative thereof is a starting component, including bottom residues. Complex mixtures of phthalic acid residues are further described in U.S. Pat. No. 5,922,779, which is herein incorporated by reference in its entirety. A preferred phthalic acid based material for use herein is phthalic anhydride or terephthalic acid.

The aliphatic carboxylic acid-based material can be any monofunctional, difunctional, or trifunctional carboxylic acids. These include, but are not limited to, fatty acids, monocarboxylic acids of 1-30 carbons, adipic acid, glutaric acid, succinic acid, citric acid, trimethylolpropionic acid, dimer acids and trimer acids of fatty acid origin, or mixtures thereof.

Preferred aliphatic carboxylic acid-based material is an aliphatic dicarboxylic acid having the generic formula (1):

$$HOOC-R^1-COOH$$

where $R^1$ is a divalent radical selected from the group consisting of
  (a) alkylene radicals each containing from 0 through 20 carbon atoms, linear or branched; and
  (b) dimer acids of fatty acid origin.

Preferred aliphatic dicarboxylic acids for use herein are adipic acid or adipic anhydride or succinic acid or succinic anhydride or glutaric acid, or mixtures thereof.

In general, the amount of aromatic acid-based material and/or aliphatic carboxylic acid-based material present in the polyester polyols of the present technology ranges from 0 to about 50% by weight of the polyester polyol.

The hydroxylated component may be an aliphatic diol of generic formula (2):

$$HO-R^2-OH$$

where $R^2$ is a divalent radical selected from the group consisting of
  (a) alkylene radicals each containing from 2 through 20 carbon atoms, and
  (b) radicals of the formula (3):

$$-(R^3O)_n-R^3-$$

where $R^3$ is an alkylene radical containing from 2 through 4 carbon atoms, and n is an integer of from 1 through 20, and
(c) mixtures thereof.

Examples of suitable aliphatic diols of formula (2) include ethylene glycol, propylene glycol, diethylene glycol, dipropylene glycol, trimethylene glycol, butylene glycols, 2-methyl-1,3-propanediol, 2,2-dimethyl-1,3-propane diol, 2-methyl-2,4-pentanediol, 1,2-cyclohexanediol, 1,18-octadecane diol, poly(oxyalkylene)polyols each containing from two to four alkylene radicals derived by the condensation of ethylene oxide, propylene oxide, or any combination thereof. As those skilled in the art will appreciate, in the preparation of mixed poly(oxyethylene-oxypropylene)polyols, the ethylene and propylene oxides may be added to a starting hydroxyl-containing reactant either in admixture or sequentially. Mixtures of such diols can be employed, if desired. A presently most preferred aliphatic diol of formula (2) is diethylene glycol. Additionally, amine-based aliphatic hydroxylated materials, for example hydroxylated amines, may be utilized, such as for example, monoethanolamine, diethanolamine, and triethanolamine.

Optionally, and for example, mixtures of diols can incorporate low molecular weight polyols (that is, compounds which contain less than 7 carbon atoms per molecule but which contain at least three hydroxyl groups per molecule) in an amount generally ranging from greater than 0 up to 100 percent of the total hydroxylated material. Such polyols comprise, for example, glycerol, 1,1,1-trimethylolpropane, 1,1,1-trimethylolethane, pentaerythritol, and mixtures thereof.

The hydroxylated component of the polyester polyol composition can be, for example, diethylene glycol, glycerol, trimethylolpropane, pentaerythritol, ethylene glycol, propylene glycol, dipropylene glycol, trimethylene glycol, butylene glycols, 1,2-cyclohexanediol, hexane diols, pentane diols, poly oxyalkylene diols (e.g. -tri and tetra ethylene glycol), derivatives thereto, and combinations thereof.

In general, the amount of the hydroxylated material present in the polyester polyols of the present technology ranges from about 20% to about 70% by weight of the polyester polyol.

The unsaturated aliphatic carboxylic acid or anhydride is selected from carboxylic acids and anhydrides, derivatives thereof, and mixtures thereof that can function as dienophiles or enophiles in Diels-Alder or Ene reactions. Suitable unsaturated carboxylic acids or anhydrides for use in preparing the polyester polyols of the present technology are maleic acid, maleic anhydride, itaconic acid, itaconic anhydride, fumaric acid, fumaric anhydride, acrylic acid, methacrylic acid, derivatives thereof, and mixtures thereof. Suitable derivatives include dihydroxyethyl maleate, dihydroxyethyloxyethyl maleate, dialkyl maleate, dialkyl itaconate, dialkyl fumarate and esters, amides and imides of (meth)acrylic acid. Particularly preferred is maleic anhydride or itaconic anhydride.

The diene or Ene component is selected from terpenes, low molecular weight dienes, alpha-olefins, natural oils with unsaturation, their fatty acids and methyl esters.

Terpenes are composed of isoprene units and are classified according to the number of isoprene units in the molecule. Hemiterpenes comprise a single isoprene unit and isoprene derivatives. Isoprene or terpene derivatives are those that have been modified chemically, such as by oxidation or by rearrangement of the carbon skeleton. Monoterpenes comprise two isoprene units, sesquiterpenes comprise three isoprene units, triterpenes comprise six isoprene units and polyterpenes comprise long chains of many isoprene units. Suitable terpenes for use as the diene component include myrcene, alpha terpinene, squalene and farnesene.

Farnesene refers to a group of biorenewable sesquiterpene chemical compounds that occur in nature and is a particularly preferred terpene for use herein. Farnesene is found in the coating of apples and other fruits, for example, and is thought to be responsible for the characteristic green apple odor. A commercial source for farnesene is Amyris (Emeryville, Calif.).

The set of chemical compounds that are referred to as farnesene include both α and β isomers, and the β isomer is more preferred for a more facile addition to a dienophile. The IUPAC name for β-farnesene is 7,11-dimethyl-3-methylene dodeca-1,6,10-triene, its molecular mass is 204.36 g/mol and its molecular formula is $C_{15}H_{24}$. The structure of β farnesene is represented by the following chemical formula (I):

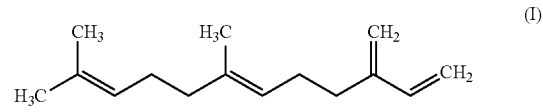

(I)

When farnesene is reacted with maleic anhydride through a Diels-Alder reaction mechanism, a farnesene maleic anhydride adduct is produced very rapidly (low cycle time and energy requirement). A synthetic scheme for the production of a farnesene maleic anhydride adduct from a Diels-Alder reaction of β-farnesene with maleic anhydride is shown in scheme 1:

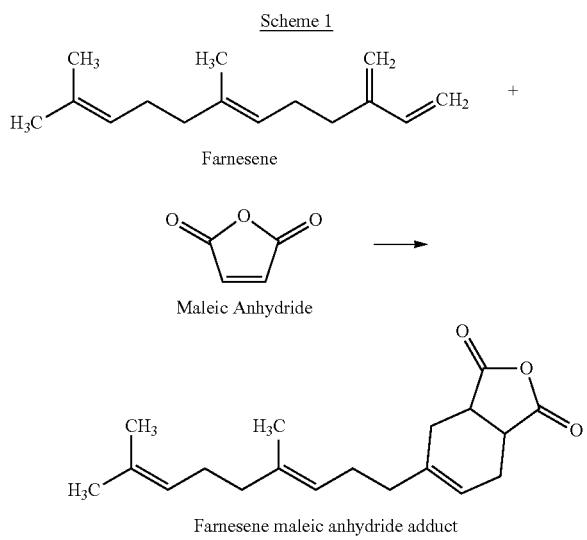

The farnesene maleic anhydride adduct can then be reacted with an aromatic polyol, for example a phthalic anhydride-diethylene glycol polyester polyol, to create an aromatic polyester polyol containing an esterified farnesene adduct. A synthetic scheme for the production of an aromatic polyester polyol containing an esterified farnesene adduct is shown in scheme 2, where the polyol structure is meant to be a random copolymer, rather than a block copolymer.

Scheme 2

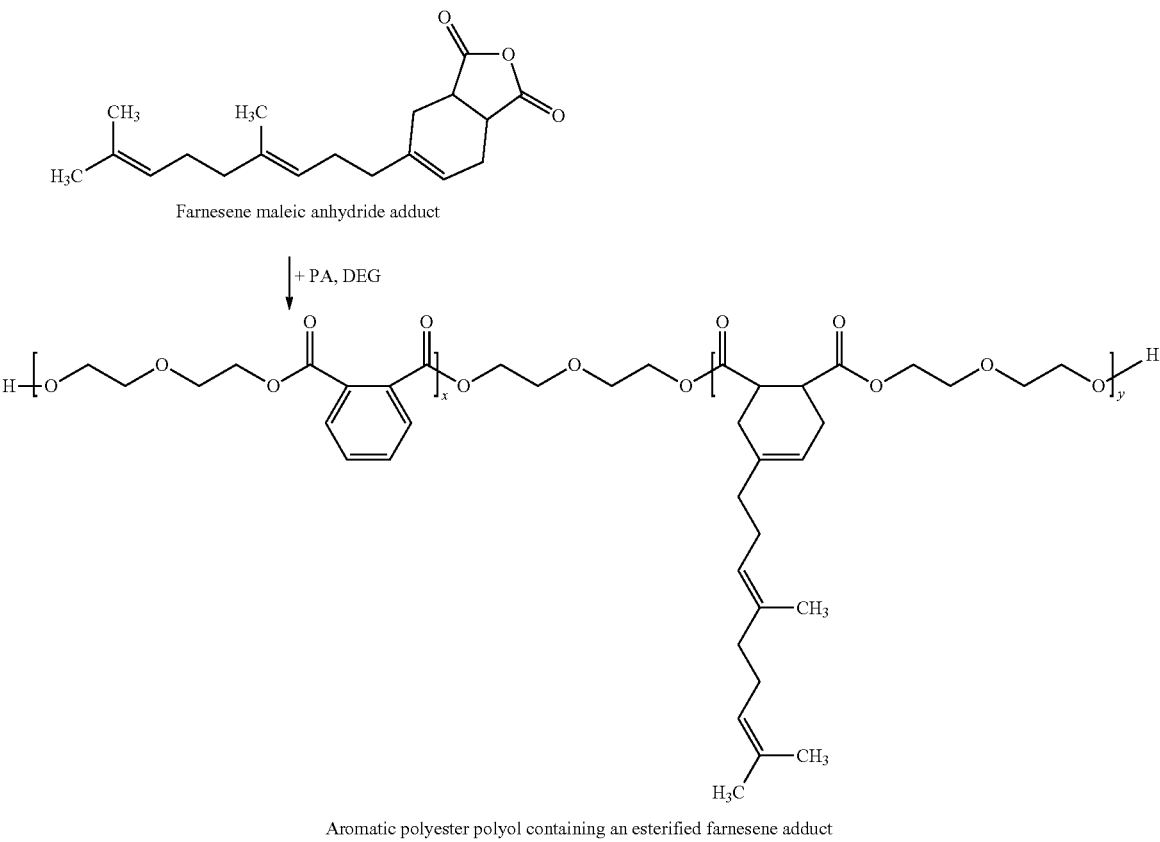

Aromatic polyester polyol containing an esterified farnesene adduct

The diene component can alternatively be a low molecular weight diene. By "low molecular weight diene" is meant a diene with carbon chain length of less than 20. Suitable low molecular weight dienes for use herein include butadiene, cyclopentadiene, dicyclopentadiene, and cyclohexadiene, etc., and mixtures thereof.

The diene or Ene component can also be a natural oil having unsaturation. Unsaturated natural oils include soybean oil, tall oil, sunflower oil, castor oil, linseed oil, tung oil, corn oil, canola oil, peanut oil, cottonseed oil, palm oil, coconut oil, rapeseed oil, fish oils, algae oil, their corresponding fatty acids, their corresponding methyl esters, and mixtures thereof.

Other diene or Ene components can be alpha-olefins. They are typically terminal olefins having a chain length of 4 to 20 carbons. The alpha-olefins may optionally contain carboxyl or ester functionality.

In general, the Diels-Alder or Ene adduct comprises from about 1% to about 75% by weight of the polyester polyols.

The polyester polyols of the present technology can be prepared through different reaction schemes. For example, the polyester polyols can be prepared directly from reactants which include an aromatic acid based material, a hydroxylated material, and a pre-formed adduct resulting from reacting the Diels-Alder or Ene reactants. In this reaction scheme (Process I), the aromatic acid, hydroxylated material and adduct are reacted together through an esterification reaction to form the polyester polyol. Alternatively, the polyester polyols can be prepared from a polyol which is the reaction product of the aromatic acid based material and the hydroxylated material, for example, a pre-formed polyester polyol. The pre-formed polyester polyol is then esterified with the pre-formed adduct to make the final polyester polyol.

In another alternative process (Process II), the aromatic acid based material, the hydroxylated material, and the dienophile or enophile component can be reacted together through an esterification reaction to form a base polyol. The base polyol is then reacted with the diene or Ene component through a Diels-Alder or Ene reaction to make the final polyester polyol.

In a further alternative process (Process III), the Diels-Alder or Ene reactants are reacted through a Diels-Alder or Ene reaction using the hydroxylated material as a heat diluent. The aromatic acid based material is then esterified into the resulting polyol to make the final polyester polyol.

The esterification reaction typically occurs at a temperature in the range of about 180° C. to about 250° C., although other temperatures can satisfactorily enable the desired esterification reaction. The esterification reaction is typically carried out in the presence of a catalyst, for example a transition metal catalyst. The transition metal catalyst can be any member selected from the group consisting of titanates, zirconates, tin based catalysts, tetraisopropyl titanate, tetrabutyltitanate, dibutyl tin oxide, oxides of zinc, oxides of lead, oxides of antimony, and combinations thereof. Other catalysts, such as alkali metal catalysts or Lewis or Bronsted acids can also be used. Catalyst amounts in the range of about 10 ppm to about 2000 ppm are useful for catalyzing the esterification reaction.

The polyester polyols of the present technology have an OH value (OHV) of about 15 to about 400, alternatively about 30 to about 400 mg KOH/g. For rigid foam applications, the polyester polyols preferably have an OHV of about 150 to about 480, alternatively about 160 to about 350 mg KOH/g. For flexible foam or CASE applications, the polyester polyols preferably have an OHV of about 15 to about 250, alternatively about 30 to about 200 mg KOH/g. The polyester polyols of the present technology have a molecular weight in the range of about 280 to about 7500. For rigid foam applications, the polyester polyols preferably have an average molecular weight of about 280 to about 1100. In one embodiment, the polyester polyol has an average molecular weight of about 400 to about 500, alternatively about 468. For flexible foam or CASE applications, the polyester polyols preferably have an average molecular weight of about 450 to about 7500. Typically, the polyester polyols have an Acid Value (mg kOH/g) of less than about 4.0, alternatively less than about 2.0, alternatively less than about 1.0, and a moisture value of less than about 0.3, alternatively less than about 0.15. For rigid foam applications, the polyester polyols have viscosities in the range of about 500-25,000 cps @ 25° C., alternatively about 1500-6000 cps 25° C.

The polyester polyols of the present technology can be used in the preparation of polyurethane resins. The polyurethane resin is formed by the reaction of a polyisocyanate composition with a polyester polyol of present technology comprising adducts from Diels-Alder or Ene reactions. Optionally a catalyst is used to form the polyurethane resin. Suitable catalysts are well known to those of skill in the art and can be, for example, tetramethylbutanediamine (TMBDA), 1,4-diaza(2,2,2)bicyclooctane (DABCO), dibutyltindilaurate (DBTDL), and tinoctoate (SnOct), and mixtures thereof. The polyurethane resin is used to prepare coatings, adhesives, sealants, and elastomers.

The polyester polyols of the present technology can be used in the preparation of both polyurethane and polyisocyanurate resins and foams. In some embodiments, the "B" side or foam masterbatch includes, but is not limited to aromatic and/or aliphatic polyester polyols, chemical or physical blowing agents, and a foaming catalyst. Methods of making foams are known to those familiar with the technology. The foams prepared using any of the aromatic polyester polyol compositions disclosed herein can be, for example, rigid foams. In still further aspects of the present technology, the foams can be, for example, closed cell rigid polyurethane foams, or urethane-modified polyisocyanurate foams. The polyurethane foams can also be flexible foams.

The polyurethane modified polyisocyanurate (PUR-PIR) foam is formed by the reaction of a polyisocyanate composition with a polyester polyol of present technology comprising adducts from Diels-Alder or Ene reaction in the presence of flame retardants, silicon surfactants, catalysts and blowing agents.

Blowing agents suitable for use in the preparation of polyisocyanurate or polyurethane foams are known to those familiar with the technology and include aliphatic or cycloaliphatic C4-C7 hydrocarbons, water, mono- and polycarboxylic acids having a molecular weight of from 46 to 300, salts of these acids, and tertiary alcohols, fluocarbons, chlorofluorocarbons, hydrochlorofluorocarbons, halogenated hydrocarbons, hydrohaloolefins (HFO). Suitable blowing agents are further described, for example, in U.S. Pat. No. 5,922,779, which is herein incorporated by reference. Particularly suitable blowing agents for use therein are pentane blowing agents, including cyclopentane, n- and isopentane, and mixtures thereof. Also, mixtures and combinations of different blowing agents can be used.

The polyester polyol compositions can also contain other additives. For example, the additives can include one or more of a nonionic surfactant, a flame retardant, a deodorant, a colorant, and combinations thereof. Nonionic surfactants are those compounds that contain one or more hydrophobic and one or more hydrophilic moieties and which have no moieties that dissociate in aqueous solution or dispersion into cations and anions. The nonionic surfactant added to the polyester polyol can be, for example, a polyoxyalkylene nonionic surfactant. While nearly any nonionic surfactant compound can be employed, in general, in the practice, of present technology, it is preferred that the nonionic surfactant be a polyoxyalkylene surfactant which contains an average of from about 4 to about 240 individual oxyalkylene groups per molecule with the oxyalkylene groups typically being selected from the group consisting of oxyethylene and oxypropylene. Polyoxyalkylene nonionic surfactants may be based on any starting material which bears a group with hydrogen atoms reactive to alkoxylation. This includes hydroxyl, carboxyl, thiol, and primary and secondary amine groups. Further nonionic surfactants suitable for use herein are further described in U.S. published application No. 2010-0240785-A1 which is herein incorporated by reference in its entirety.

Typically, the amount of the nonionic surfactant added to the polyester polyol, based on the combined weight of the polyester polyol and nonionic surfactant is generally from about 1% to about 15% by weight.

It has been unexpectedly realized by the inventors that foam products produced from the polyester polyols of the present technology exhibit improved green strength, compressive strength, flammability characteristics and K factor performance. Also, the stability of the B-side containing polyester polyols for the present technology is improved compared to commercially available polyols. It has also been discovered that the polyester polyols of the present technology exhibit similar viscosity reducing properties when compared to other biorenewable-containing polyester polyols.

Polyurethane-modified polyisocyanurate (PU-PIR) foam is closed cell foam widely used in the commercial roofing market. This material is used primarily as a component in roofing board due to its superior insulation, mechanical strength and capacity to meet certain building code regulations. Such foams are typically prepared by reacting an aromatic polyester polyol with a polyisocyanate.

The aromatic polyester polyols of the present technology possess a wide breadth of applications including but not limited to, polyisocyanurate (PIR) and polyurethane (PUR) foams in both rigid insulation and flexible foam uses. The insulation value, strength, and dimensional stability advantages realized with the polyester polyols of the present technology are desirable foam performance attributes needed in the PIR and PUR fields. There is also a need for renewable polyol technologies that the polyester polyols of the present technology address.

For example, when aromatic polyester polyols of the present technology containing farnesene are used instead of polyester polyols containing soybean oil to produce foam, at an equivalent renewable weight percent, foams produced from the farnesene based polyols exhibited improved green strength, compressive strength, flammability characteristics and K factor performance, when compared to foams made with the soybean oil-containing polyol. Also, the polyester polyols of the present technology exhibit good mold filling ease, and the resulting foams exhibit good density and friability properties.

Also, it has been unexpectedly discovered that when the esterified farnesene adducts of the present technology are incorporated into polyols at about 25% renewable content, foam performance is significantly improved compared to many other polyols containing about 25% renewables. The unique "graft" position of reactants such as farnesene onto the polyester polyol backbone allows for maintenance of polyol functionality, while delivering viscosity reducing and compatibilization advantages.

It has also been discovered that the polyester polyols of the present technology improve B-side component stability compared to the soybean oil-containing polyester polyol. Here stability means there is no blowing agent separated out to form a layer on the top of emulsion within a specified period of time. For example, the B side is stable for more than 10 days when the polyester polyol of the present technology was used in an N-pentane system, whereas the B-side containing a soybean-containing polyol is only stable for 2-3 hours before a layer of pentane appears on top of the emulsion.

The polyester polyols of the present technology can be used in polyurethane non-foam applications, such as in coatings, adhesives, sealants and elastomers (CASE) applications. For example, the polyester polyols can be used in pigment dispersions that are useful in coatings applications.

The pigment dispersions are prepared by mixing from about 10% to about 95% by weight of the polyester polyol of the present technology, alternatively about 10% to about 70% by weight, alternatively about 20% to about 60% by weight, alternatively about 30% to 50% by weight, with from about 10% to about 75% by weight of a suitable pigment, alternatively about 10% to about 50% by weight, alternatively about 15% to about 45% by weight, alternatively, about 15% to about 40% by weight of a suitable pigment. In one embodiment, the polyester polyol comprises a Diels-Alder adduct of farnesene and maleic anhydride. Suitable pigments can be organic or inorganic pigments. Inorganic pigments include carbon black, Milori blue (Fe $(NH_4)Fe(CN)_6 \cdot xH2O$), Titanium oxide, chrome yellow (Pb-$CrO_4$,/$PbSO_4$), iron oxide, and molybdate orange (($PbCrO_4$,/$PbMoO_4$.). Organic pigments include azo red, naphthol red, diarylide yellow, diarylide orange, phthalo blue, phthalo green, quinacridones, diketopyrrolo-pyrrole, isoindolinones, and perlenes. A particularly suitable pigment is SUNFAST® blue 15:4, a phthalo blue pigment produced by Sun Chemical (Cincinnati, Ohio).

Additional components can also be included in the pigment dispersions. For example, the pigment dispersions can comprise additional monomers and can include additives, such as pigment dispersion agents. The additional monomers are used primarily as diluting agents to control the viscosity of the pigment dispersion. One or more additional monomers that can be incorporated into the pigment dispersion include, without limitation mono-, di, tri, tetracrylate and methacrylates, such as 2,2-bis[4-3(-(meth)acryloxy-2-hydroxypropoxy)phenyl]-propane, Bisphenol di(meth)acrylate, neopentylglycol di(meth)acrylate, decanediol-1,10-di (meth)acrylate, dodecanediol-1,12-di(meth)acrylate, 1,4,-butanediol di(meth)acrylate, ethyleneglycol di(meth)acrylate, diethyleneglycol di(meth)acrylate, triethyleneglycol di(meth)acrylate, tetraethyleneglycol di(meth)acrylate, polyethyleneglycol di(meth)acrylate, propyleneglycol di(meth)acrylate, dipropyleneglycol di(meth)acrylate, tripropylene di(meth)acrylate, tetrapropyleneglycol di(meth)acrylate, polypropyleneglycol di(meth)acrylate, hexamethyleneglycol di(meth)acrylate, hydroxyethyl(meth)acrylate,di-2 (meth)acryloxyethyl-2,2,4-trimethylhexamethylene dicarbamate, and tetrahydrofurfryl(meth)acrylate. Such additional monomers are present in the pigment dispersion in a total amount of about 1% to about 40% by weight of the dispersion, alternatively about 2% to about 20% by weight.

Pigment dispersion agents contemplated for use in the pigment dispersion are organic compounds that can form a bridge between the pigment powder and the resin matrix. Such pigment dispersion agents act in a way similar to a surfactant and improve the pigment dispersion in one or more of the following ways:
 1. Increasing pigment concentration
 2. Improve pigment wetting
 3. Higher gloss and strength
 4. Improve rheology In general, anionic, cationic and non-ionic dispersion agents are common dispersion agents. Cationic dispersion agents include lauryl-pyridium chloride, cetyldimethyl amine acetate, and alkyldimethylbenzylammonium chloride in which the alkyl group has from 8 to 18 carbon atoms. Anionic dispersion agents include sodium lauryl sulfate, alkylaryl sulfate such as sodium or potassium isopropylbenzene sulfate, or isopropyl naphthalene sulfonate, alkali metal higher alkyl sulfosuccinates, such as sodium octyl sulfosuccinate, sodium N-methyl-N-palmitoyltaurate, sodium oley isothionate, and alkali metal salts of alkylarylpolyethoxyethanol sulfates or sulfonates, such as sodium tert-octylphenoxy polyethoxyethyl sulfate having 1 to 5 oxyethylene units. Non-ionic dispersion agents include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxy-ethanols, polyethoxyethanol derivatives of methylene-linked alkyl phenols; sulfur-containing agents such as those made by condensing from about 6 to 60 moles of ethylene oxide with nonyl mercaptan, dodecyl mercaptan or with alkylthiophenols wherein the alkyl groups contain from 6 to 16 carbon atoms; ethylene oxide derivatives of long-chained carboxylic acid, such as lauric acid, myristic acid, and palmitic acid, sorbitan monostearate containing from 6 to 60 oxyethylene condensates of long chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. A suitable pigment dispersion agent is Solsperse® 39000, a non-ionic dispersion agent available from Lubrizol Corporation, Cleveland, Ohio. Pigment dispersion agents are typically present in the pigment dispersion in an amount of about 0.005% to about 10% by weight of the pigment dispersion, alternatively 0.5% to about 5% by weight.

In general, the pigment dispersions are prepared by mixing the polyester polyol and other contemplated monomers and additives with the pigment, which is typically in a powdered form. Three-roll milling after mixing thoroughly distributes and wets the pigment powder. The resulting paste-like pigment dispersion has a lower yield stress and better pigment dispersibility compared to pigment dispersions prepared with other polyester polyols.

It is contemplated that the polyester polyols containing Diels-Alder or Ene adducts as described herein can be reacted with a (meth)acrylic acid or a derivative thereof to form polyol acrylates. Useful (meth)acrylic acids or derivatives have the following structural formula:

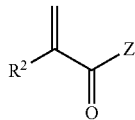

wherein $R^2$ is hydrogen, methyl or ethyl, aromatic or a C3 to C20 straight or branched alkyl, and Z is chloride, bromide, hydroxyl, ester or a mixture thereof. The polyol acrylates can be used to produce paint and varnish coatings, inks, adhesives and sealants.

It is also contemplated that the polyester polyols of the present technology can be reacted with an isocyanate compound and a hydroxyl-containing (meth)acrylate compound to prepare polyurethane acrylates. The polyurethane acrylates are prepared by, for example, reacting the polyester polyol containing the Diels-Alder or Ene adduct, with an excess amount of an isocyanate to make an isocyanate-terminated prepolymer, which can then be reacted with a hydroxyl functioning (meth)acrylate. Alternatively, a hydroxyl functioning (meth)acrylate can be reacted with an excess amount of isocyanate to form a prepolymer, and then the polyester polyol can be reacted with the prepolymer to form the polyurethane acrylate.

EXAMPLES

The following components were used in the following examples:

Adduct 1: Diels-Alder reaction adduct from Farnesene (Bedoukian) and Maleic Anhydride (Aldrich)

Adduct 2: Diels-Alder reaction adduct from Methylcyclopentadiene and Maleic Anhydride, Obtained from Aldrich as Methyl-5-norbornene-2,3-dicarboxylic anhydride Adduct 3: Ene reaction adduct from 1-Dodecene and Maleic Anhydride, obtained from Aldrich as Dodecenylsuccinic anhydride, mixture of isomers Adduct 4: Diels-Alder reaction adduct from Butadiene and Maleic Anhydride, obtained from Aldrich as cis-1,2,3,6-Tetrahydrophthalic anhydride Adduct 5: Diels-Alder reaction adduct from Farnesene Isomer (Bedoukian) and Maleic Anhydride Adduct 6: Diels-Alder reaction adduct from Farnesene (Bedoukian) and Itaconic Anhydride (Aldrich)

Adduct 7: Diels-Alder reaction adduct from Myrcene (Aldrich) and Maleic Anhydride (Aldrich)

Adduct 8: Maleinized soybean oil

Adduct 9: Diels-Alder reaction adduct from tung oil and maleic anhydride

Fyrol® PCF: Tris(2-chloroisopropyl)phosphate, a flame retardant produced by Israel Chemicals, Ltd. (ICL)

Polycat® 5: Pentamethyldiethylenetriamine, a catalyst from Air Products and Chemicals, Inc.

Dabco® K-15: a solution of potassium 2-ethylhexanoate in Diethylene Glycol from Air Products and Chemicals, Inc.

Polycat® 46: a solution of potassium acetate in Ethylene glycol from Air Product and Chemicals, Inc TEGOSTAB® B-8465: a silicone cell-stabilizing surfactant from Evonik Industries AG Mondur® M-489: a high-functionality polymeric diphenylmethane diisocyanate (PMDI) from Bayer Material Science LLC Polyol A: STEPANPOL® PS-2352, a PA-DEG polyester polyol available from Stepan Company, with nominal OH value 240 mg KOH/g Nonionic Surfactant: Polyoxyalkylene nonionic surfactant Acrol® F-3022: a polyether polyol from Bayer Material Science LLC L-655: Silicone surfactant from Momentive Voranol® 800: polyether polyol from The Dow Chemical Company Multranol®4034: polyether polyol from Bayer MaterialScience Niax® A-1: Amine catalyst from Momentive Polycat® 8: Amine catalyst from Air Products Curithane® 52: Amine based catalyst from Air Products Mondur® MR-light: aromatic polymeric isocyanate from Bayer MaterialScience Fyrol® FR-2: Tris(1,3-dichloro-2-propyl)Phosphate from ICL DMEA: Dimethylethanolamine SnOct: Stannous(II) octoate

Polyol Synthesis Examples

Example 1

Polyol 1: 6.4 mols of aromatic diacid, 1.6 moles of maleic anhydride and 14.29 mols of diethylene glycol (DEG) were charged to a reactor affixed with mechanical stirring, nitrogen inlet, packed column, condenser with receiver, and temperature control and then heated to 230° C. under nitrogen sparge. When the acid value (AV) was 3 or below, a transition metal catalyst was added. When the AV was about 1, the hydroxyl value (OHV) was measured and adjusted with DEG to get the target value. This yielded a polyol with 280 mg KOH/g OHV and 0.8 mg KOH/g AV.

Example 2

Polyol 2: 3.4 mols of aromatic diacid, 0.55 moles of Adduct 1 and 7.09 mols of DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target value. Then the mixture was cooled down to 90° C. and 0.05 mole of nonionic surfactant was added and mixed for 30 min. This yielded a polyol with OHV=247 mg KOH/g and AV=0.8 mg KOH/g.

Example 3

Polyol 3: 412.5 g Polyol 1 and 37.5 g Farnesene were charged to a reactor affixed with mechanical stirring, nitrogen inlet, packed column, condenser with receiver, and temperature control and then heated to 180° C. under nitrogen sparge for 4 hours. The reaction completion was monitored by Gel Permeation Chromatography (GPC). Then the material was cooled down to 90° C. and 0.02 mole of nonionic surfactant was added into the reactor. Then the mixture was mixed for 30 min. This yielded a polyol with OHV=235 mg KOH/g and AV=1.0 mg KOH/g.

Example 4

Polyol 4: 0.37 mols of maleic anhydride, and 4.73 mols of DEG were charged to a reactor affixed with mechanical stirring, nitrogen inlet, packed column, condenser with receiver, and temperature control and then heated to 50° C. to obtain a homogeneous solution under nitrogen sparge. Then 0.37 mols of Farnesene were added into the reactor and the reaction was monitored by GPC. Then 2.27 mols aromatic diacid was added and the reaction temperature was raised to 230° C., When the AV was 3 or below, a transition metal catalyst was added. When the AV was about 1, the OHV was measured and adjusted with DEG to get the target value. Then the material was cooled down to 90° C. and 0.04 mole of nonionic surfactant was added in and the mixture was mixed for 30 min. This yielded a polyol with OHV=251 mg KOH/g and AV=0.7 mg KOH/g.

Example 5

Polyol 5: 2.64 mols of aromatic diacid, 1.48 moles of Adduct 2 and 7.26 mols of DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target value. Then the mixture was cooled down to 90° C. and 0.06 mole of nonionic surfactant was added and mixed for 30 min. This yielded a polyol with OHV=237 mg KOH/g and AV=0.7 mg KOH/g.

Example 6

Polyol 6: 3.24 mols of aromatic diacid, 0.71 moles of Adduct 3 and 7.09 mols of DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target value. Then the mixture was cooled down to 90° C. and 0.06 mole of nonionic surfactant was added and mixed for 30 min. This yielded a polyol with OHV=238 mg KOH/g and AV=0.6 mg KOH/g.

Example 7

Polyol 7: 3.65 mols of aromatic diacid, 0.64 moles of Adduct 4 and 7.44 mols of DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target value. Then the mixture was cooled down to 90° C. and 0.06 mole of nonionic surfactant was added and mixed for 30 min. This yielded a polyol with OHV=241 mg KOH/g and AV=0.8 mg KOH/g.

Example 8

Polyol 8: 3.34 mols of aromatic diacid, 0.59 moles of Adduct 5 and 7.07 mols of DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target number. Then the mixture was cooled down to 90° C. and 0.06 mole of nonionic surfactant was added and mixed for 30 min. This yielded a polyol with OHV=250 mg KOH/g and AV=1.3 mg KOH/g.

Example 9

Polyol 9: 2.21 mols of aromatic diacid, 0.39 moles of Adduct 6 and 4.69 mols of DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target number. Then the mixture was cooled down to 90° C. and 0.04 mole of nonionic surfactant was added and mixed for 30 min. This yielded a polyol with OHV=244 mg KOH/g and AV=0.8 mg KOH/g.

Example 10

Polyol 10: 2.07 mols of aromatic diacid, 0.59 moles of Adduct 7 and 4.75 mols of DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target number. Then the mixture was cooled down to 90° C. and 0.04 mole of nonionic surfactant was added and mixed for 30 min. This yielded a polyol with OHV=247 mg KOH/g and AV=0.7 mg KOH/g.

Example 11

Polyol 11: 412.5 g Polyol 1 and 37.5 g Myrcene were charged to a reactor affixed with mechanical stirring, nitrogen inlet, packed column, condenser with receiver, and temperature control and then heated to 180° C. under nitrogen sparge for 4 hours. The reaction completion was monitored by GPC. Then the material was cooled down to 90° C. and 0.02 mole of nonionic surfactant was added into the reactor. Then the mixture was mixed for 30 min. Some insoluble material was observed, which was filtered out. This yielded a polyol with OHV=250 mg KOH/g and AV=0.8 mg KOH/g.

Examples 12-14 illustrate the preparation of polyester polyols containing 25% biorenewable material.

Example 12

Polyol 12: 2.72 mols of aromatic diacid, and 5.86 mols of DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. Then 375 g soybean oil was added to the mixture. The temperature was kept to 220° C. The transesterification was completed when the mixture was homogeneous both at high temperature and at room temperature. When the AV was about 1, the OHV was measured and adjusted with DEG to get the target number. Then the mixture was cooled down to 90° C. and 0.06 mole of nonionic surfactant was added and mixed for 30 min. This yielded a polyol with OHV=234 mg KOH/g and AV=0.9 mg KOH/g.

Example 13

Polyol 13: 0.95 mols of aromatic diacid, 1.16 moles of Adduct 1 and 4.21 mols of DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target number. Then the mixture was cooled down to 90° C. and 0.04 mole of nonionic surfactant was added and mixed for 30 min. This yielded a polyol with OHV=243 mg KOH/g and AV=0.4 mg KOH/g.

Example 14

Polyol 14: 571 g of aromatic diacid, and 1074 g of DEG and 500 g Adduct 8 were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target number. Then the mixture was cooled down to 90° C. and 0.06 mole of nonionic surfactant was added and mixed for 30 min. This yielded a polyol with OHV=235 mg KOH/g and AV=1.4 mg KOH/g.

Polyol Properties

Properties of the polyols produced in Examples 1-14 are further summarized in Table 1A along with viscosity of the polyols, where PI, PII, and PIII refer to polyols made by process I, II, and III, respectively:

TABLE 1A

Polyol Compositions and Properties

| | Composition Identifier | OHV | AV | Viscosity |
|---|---|---|---|---|
| 1 | PA/MA/DEG | 280 | 0.7 | 5065 |
| 2 | Farnesene PI | 246 | 1.1 | 4100 |
| 3 | Farnesene PII | 235 | 1.0 | 4447 |
| 4 | Farnesene PIII | 251 | 0.7 | 4348 |
| 5 | Methy-cyclopentadiene | 237 | 0.7 | 4734 |
| 6 | Dodecene | 238 | 0.6 | 3752 |
| 7 | Butadiene | 241 | 0.8 | 5594 |
| 8 | Farnesene Isomer | 250 | 1.3 | 5815 |
| 9 | Farnesene-Itaconic Anhydride | 244 | 0.8 | 5021 |
| 10 | Myrcene PI | 247 | 0.7 | 4877 |
| 11 | Myrcene PII | 250 | 0.8 | 3550 |
| 12 | Soybean Oil (25%) | 234 | 0.9 | 730 |
| 13 | Farnesene (25%) PI | 243 | 0.4 | 1630 |
| 14 | Maleinized soybean oil (25%) | 235 | 1.4 | 1525 |

The molecular weight and distribution of polyol A and the polyols produced in Examples 2-14 were measured using the Gel Permeation Chromatography (GPC) method, and the molecular weights and molecular weight distribution results are shown in Table 1B:

TABLE 1B

Polyol Molecular Weight Properties

| Polyol # | Mn | Mw | Polydispersity |
|---|---|---|---|
| A | 364 | 904 | 2.48 |
| 2 | 601 | 1036 | 1.73 |
| 3 | 667 | 1184 | 1.78 |
| 4 | 608 | 1063 | 1.75 |
| 5 | 332 | 857 | 2.58 |
| 6 | 605 | 1051 | 1.74 |
| 7 | 393 | 929 | 2.36 |
| 8 | 587 | 1160 | 1.98 |
| 9 | 600 | 1016 | 1.69 |
| 10 | 400 | 1046 | 2.61 |
| 11 | 390 | 1040 | 2.66 |
| 12 | 414 | 923 | 2.23 |
| 13 | 760 | 1297 | 1.71 |
| 14 | 674 | 1344 | 2.00 |

The pentane solubility of polyol A and the produced polyols in Examples 2-14 was measured by blending pentane into 40 g polyol at an interval of 0.4 g pentane at a time until the mixture turns opaque. The maximum pentane dissolved in the polyol was recorded as part per hundred part of polyol (pphp). Polyol pentane solubility results are listed in table 2:

TABLE 2

Polyol pentane solubility

| Polyol # | N-pentane | Cyclo-pentane |
|---|---|---|
| A | 12 | 27 |
| 2 | 2 | 17.5 |
| 3 | 2 | 18 |
| 4 | 2 | 18 |
| 5 | 2 | 14 |
| 6 | 3 | 19 |
| 7 | 2 | 11 |
| 8 | 2 | 17 |
| 9 | 3 | 18 |
| 10 | 2 | 18 |
| 11 | 2 | 18 |
| 12 | 75 | 23 |
| 13 | 9 | 39 |
| 14 | 16.5 | >50 |

Preparation of Foams

The formulation used to prepare each of the foams in the following Examples 15-28 is listed in Table 3:

TABLE 3

Formulations

| Polyol | 71.52 |
|---|---|
| Fyrol ®PCF | 7.15 |
| Polycat ® 5 | 0.20 |
| Dabco ® K-15 | 2.15 |
| Polycat ® 46 | 0.21 |
| TEGOSTAB ® B-8465 | 1.43 |
| Water | 0.18 |
| N-Pentane | 17.16 |
| Total | 100.00 |
| Index | 250 |
| Mondur ® M-489 | 118.02 |

Foam Reaction Characteristics

Closed-cell polyurethane-modified polyisocyanurate foams were produced in Examples 15-28 from reaction between the B-side and the A-side polyisocyanate. B-side resin blends were made by blending each example polyol, flame retardant, surfactant, catalysts and blowing agents etc. together according to the formulation in Table 3. The resin blend and polyisocyanate, at 20° C., were combined in a paper cup at a ratio calculated from the formulation to give the required index. 300 g total of polyisocyanate and B-side were combined and agitated for 6.5 seconds using a motor-driven mixing blade rotating at 3400 rpm, and the mixture was poured into a tared paper cup with volume of about 5 L.

The reactivity details including cream time, string gel time, firm gel time and tack free time were all measured. Foam reactivity and density results for Examples 15-28 are presented in Table 4:

TABLE 4 foam reactivity (second) and density(pcf)

| Example # | Polyol # | Cream | String gel | Firm gel | Tack free | Density (pcf) |
|---|---|---|---|---|---|---|
| 15 | A | 12 | 28 | 35 | 46 | 1.61 |
| 16 | 2 | 11 | 28 | 36 | 44 | 1.62 |
| 17 | 3 | 11 | 26 | 36 | 46 | 1.61 |
| 18 | 4 | 11 | 25 | 32 | 38 | 1.65 |
| 19 | 5 | 10 | 23 | 30 | 37 | 1.59 |
| 20 | 6 | 11 | 24 | 32 | 39 | 1.62 |
| 21 | 7 | 11 | 26 | 33 | 44 | 1.60 |
| 22 | 8 | 11 | 26 | 34 | 38 | 1.67 |
| 23 | 9 | 11 | 24 | 31 | 37 | 1.63 |
| 24 | 10 | 11 | 24 | 30 | 36 | 1.63 |
| 25 | 11 | 11 | 26 | 34 | 46 | 1.68 |
| 26 | 12 | 14 | 32 | 40 | 56 | 1.63 |
| 27 | 13 | 11 | 25 | 33 | 38 | 1.64 |
| 28 | 14 | 12 | 32 | 46 | 53 | 1.55 |

Green Strength and Compressive Strength of Foams

Green strength and compressive strength of the foams from Examples 15-28 were tested. Following the foaming method described above, foam above the top edge of the cup was cut off at 2:00 minutes after A-side and B-side mixed together, and a smooth surface was obtained. Green strength of the foam was measured on this surface at 2, 3, 4, 5 and 6 minutes using an Instron 2200 instrument by controlling the indentation at 0.35 inches in the foam. The force needed to reach that indentation was measured and the strength was calculated. Density in lbs/cu. ft. (pcf) was obtained after the green strength measurements. Compressive strength of the foam was measured using the same Instron after the foam was cured for 24 hours at room temperature. The green strength results are presented in Table 5

TABLE 5

Foam Green Strength (psi) at Specific Time (min)

| Example # | Polyol # | 2 | 3 | 4 | 5 | 6 |
|---|---|---|---|---|---|---|
| 15 | A | 8.8 | 13.8 | 17.0 | 19.3 | 21.8 |
| 16 | 2 | 10.3 | 15.3 | 18.4 | 21.3 | 23.2 |
| 17 | 3 | 9.4 | 14.2 | 17.1 | 19.6 | 21.1 |
| 18 | 4 | 11.5 | 16.6 | 19.3 | 22.0 | 24.1 |
| 19 | 5 | 10.6 | 16.9 | 20.5 | 22.4 | 23.5 |
| 20 | 6 | 10.2 | 15.3 | 18.0 | 19.8 | 22.2 |
| 21 | 7 | 10.6 | 15.9 | 19.5 | 21.7 | 22.8 |
| 22 | 8 | 11.0 | 16.1 | 19.3 | 21.0 | 23.4 |
| 23 | 9 | 11.1 | 15.9 | 19.2 | 21.6 | 23.2 |
| 24 | 10 | 11.2 | 16.5 | 19.2 | 21.6 | 23.3 |
| 25 | 11 | 10.3 | 15.2 | 17.4 | 19.6 | 21.1 |
| 26 | 12 | 6.3 | 9.0 | 11.5 | 13.2 | 14.7 |
| 27 | 13 | 8.7 | 12.4 | 15.0 | 16.7 | 18.8 |
| 28 | 14 | 5.8 | 9.8 | 12.7 | 14.9 | 16.4 |

The green strength results show that compared to the control polyol A (Example 15) with an equivalent level of biorenewable material, Examples 16-25, made from polyols of present technology, give better green strength at the same reactivity and density. The same results were observed for the parallel compressive strength listed in Table 6. The same trend was observed when a higher equivalent level of biorenewable is incorporated, as shown by the results of Example 26, made from a polyol containing 25% SBO, compared with Examples 27 and 28, made with polyols of the present technology.

The parallel compressive strength results are presented in Table 6:

TABLE 6

Parallel Compressive Strength (psi)

| Example # | Polyol # | compressive (psi) |
|---|---|---|
| 15 | A | 28.9 |
| 16 | 2 | 30.8 |
| 17 | 3 | 30.3 |
| 18 | 4 | 32.1 |
| 19 | 5 | 29.7 |
| 20 | 6 | 30.0 |
| 21 | 7 | 31.4 |
| 22 | 8 | 32.1 |
| 23 | 9 | 31.6 |
| 24 | 10 | 32.1 |
| 25 | 11 | 26.6 |
| 26 | 12 | 22.0 |
| 27 | 13 | 27.6 |
| 28 | 14 | 24.3 |

Foam Insulation Properties

A 6.5 inches×6 inches×1 inch sample was cut from the foam with rise directions parallel to the 6.5 inch edge for insulation properties. The foam was surrounded by a piece of aged rigid foam and K factor was measured by a Laser-Comp heat flow meter instrument with samples between two parallel plates at constant but different temperatures using method ASTM C-518.

4 inches×4 inches×1.25 inches sample was cut and used for hot plate tests. The foam was put on a hot plate at a temperature of 1200° F. and kept in place for 15 minutes. During that time, the temperature was gradually cooled from 1200° F. to 1000° F. using a programmed thermal controller. The weight and thickness change of the foam was measured and recorded afterwards. Volume expansion of the foam under thermal stress is preferable, and less weight loss is presumed to indicate a better thermal stability.

Molded foam was made on the Edge-Sweet high pressure machine with both A and B side temperature between 75F-80F, and pressure at 2500 psi. Panels with 15 inches×13 inches×3 inches dimension were made at 120° F. mold temperature and cured for 10 minutes in the mold followed by curing in the oven at 200° F. for 24 hours for the physical tests including three-dimensional compressive strength and large size K factor measurements, foam friability and open cell content etc.

The insulation properties (K factor) are presented in Table 7:

TABLE 7

Foam insulation property (Btu · in/Ft$^2$ · hr · F.)

| Example # | Polyol # | K factor |
|---|---|---|
| 15 | A | 0.1525 |
| 16 | 2 | 0.1479 |
| 17 | 3 | 0.1477 |
| 18 | 4 | 0.1471 |
| 19 | 5 | 0.1484 |
| 20 | 6 | 0.1476 |
| 21 | 7 | 0.1464 |
| 22 | 8 | 0.1457 |
| 23 | 9 | 0.1477 |
| 24 | 10 | 0.1477 |
| 25 | 11 | 0.1507 |
| 26 | 12 | 0.1588 |
| 27 | 13 | 0.1481 |
| 28 | 14 | 0.1540 |

Foam examples 29 and 30 were foam made on an Edge-Sweet high pressure machine. Material was metered and mixed under 2500 psi pressure. Foam with dimensions of 25 inches×15 inches×3 inches was molded at 120F. Physical results, including reactivity, green strength, compressive strength, K-factor are listed in Table 8:

TABLE 8

Physical properties of foam from high pressure machine

| | Example # | |
|---|---|---|
| | 29 | 30 |
| Polyol | A | 2 |
| Index | 260 | 260 |
| Reactivity (gel time, s) | 16 | 15 |
| Cup Density (PCF) | 1.54 | 1.57 |
| Flow Index | 1.97 | 1.88 |
| Initial Core K factor (Btu · in/Ft2 · hr · F.) | 0.1503 | 0.1493 |
| 1 Month aged K factor (Btu · in/Ft2 · hr · F.) | 0.1608 | 0.1594 |
| Emulsion Stability | 3-4 hours | >10 days |
| Green Strength @ 2 min (psi) | 7.09 | 9.98 |
| Compressive X (psi) | 10.79 | 12.30 |
| Compressive Y (psi) | 27.21 | 32.71 |
| Compressive Z (psi) | 8.36 | 9.25 |
| Normalized Average Compressive (psi) | 15.46 | 18.09 |
| Friability (% loss) | 12.96 | 7.62 |
| Close Cell % | 86.56 | 87.87 |
| Hot plate sample weight change (%) | −33 | −31 |
| Hot plate sample thickness change (%) | −10 | +0.4 |

From the data shown in Table 8, it can be seen that the foam prepared from polyol 2 of present technology has better physical performance including green strength, three-dimensional compressive strength, friability and close cell content and initial and aged insulation properties compared to foam prepared from polyol A.

Synthesis of Polyols for Flexible Foams

The following examples 31-34 illustrate the preparation of polyester polyols for use in flexible foams.

Example 31

Stepanpol® PS-2002 (1522 g), Adduct 1 (farnesene maleic anhydride adduct, 329 g), and DEG (169 g) were charged to a 5-L flask, and agitated under N2 for ca 10 hours at 210-220° C. The clear yellow product (2009 g recovered) has an AV of 0.32 mg KOH/g, OHv of 188.2 mg KOH/g, and a viscosity of 12,900 cps at 25° C. Mn=2,640, Mw=10,905, Mw/Mn=4.1.

Example 32

Adduct 1 (155 g), DEG (70 g) and glycerine (6 g) were charged into a 500 mL flask and heated to 190° C. under N2, and 0.1 g of TnBT is added. The mixture was heated for ca 8 h at 190-220° C. until an acid no. of 1.0 mg KOH/g was reached. The product (197 g recovered) is a yellow viscous liquid having an OHv of 57.4 mg KOH/g, and a viscosity of 37,000 cps at 25° C. Mn=2,113, Mw=6,848, Mw/Mn=3.2.

Example 33

Adipic acid (261 g), Adduct 1 (301 g), DEG (300 g) and glycerine (23 g) were charged into a 1-L flask and heated to 180-220° C. under N2 for ca 17 h. TnBT (0.16 g) was added when the formation of the condensate became slow. The product (777 g recovered) is a pale yellow viscous liquid having an AV of 1.0 mg KOH/g, OHv of 62.6 mg KOH/g, and viscosity of 24,000 cps at 25° C. Mn=700, Mw=1,094, Mw/Mn=1.6.

Example 34

PA (84 g), adipic acid (207 g), DEG (307 g), glycerine (23 g) and Adduct 1 (257 g) are charged into a 1-L flask and heated to 180-220° C. under N2 for ca 15 h. TnBT (0.16 g) is added when the formation of a condensate becomes slow. The product is a pale yellow viscous liquid having an AV of 1.0 mg KOH/g, OHv of 60 mg KOH/g, and viscosity of about 20,000 cps at 25° C.

Example 35

Flexible Foam Evaluation of Polyol in Example 31

The polyol from Example 31 was evaluated in a flexible polyurethane foam. The foam formulation containing the Example 31 polyol was compared against a control formulation not containing the Example 31 formulation. The foam formulations and resulting properties are provided in Table 9.

TABLE 9

| Flexible Slabstock Foam Evaluation | | |
|---|---|---|
| Arcol ® F-3022 Polyether Polyol | 100 | 90 |
| Example 31 Polyol | | 9 |
| Propylene Carbonate | | 1 |
| L-655 Surfactant | 1.5 | 1.5 |
| Catalysts DMEA/SnOct | 0.31/0.17 | 0.31/0.11 |
| Fyrol FR-2 | 16.8 | 16.8 |
| Propylene Carbonate | — | 1.0 |
| Water | 4.8 | 4.8 |
| A/B wt ratio @ 117 Index | 0.526 | 0.543 |
| Airflow (scfm) | 2.7 | 3.1 |
| Density (pcf) | 1.48 | 1.50 |
| Tear St. (pli) | 1.65 | 1.87 |
| Tensile St. (psi) | 9.4 | 11.1 |
| Elongation (%) | 83 | 99 |
| 90% Comp Set (%) | 9.7 | 14.9 |
| 25% Guide Factor | 25.1 | 25.6 |

Example 36

Synthesis of Polyol Containing Diels-Alder Adduct of Tung Oil and Maleic Anhydride Tung oil (850 g) and maleic anhydride (MA) (250 g) were mixed in a 5 L flask. Upon heating to 60° C., the temperature of the mixture increased to 120° C. within 15 min, which is subsequently maintained at 100° C. for 45 min. 1099 g of MA-tung oil adduct (Adduct 9) was obtained upon cooling.

Phthalic anhydride (PA) (1776 g), Adduct 9 (475 g), DEG (2436 g) were charged into a 5 L flask and agitated under N2 for about 12 hours at 195-230° C. TnBT (1.0 g) was added when the formation of the condensate became slow. An amber liquid (4336 g) was formed having an AV of 0.9 mg KOH/g, OHv of 236 mg KOH/g, and viscosity of 9800 cps at 25° C. 2350 g of this amber liquid was further mixed with DEG (84 g) and heated to 215-220° C., and an additional 0.4 g of TnBT was added. The mixture was stirred under N2 at the temperature for about 1 h, and 2413 g of a second amber liquid was yielded having an AV of 0.8 mg KOH/g, OHv of 269 mg KOH/g, and viscosity of 6000 cps at 25° C. 788 g of this amber liquid was further mixed with polyoxyalkylene nonionic surfactant (88 g) at 70-100° C., and 876 g of the final product, an amber liquid, was obtained, which has an AV of 0.8 mg KOH/g, OHv of 243 mg KOH/g, and viscosity of 5200 cps at 25° C. Mn=605, Mw=1178, and Mw/Mn=1.9.

Example 37

Foam Evaluation of Polyol in Example 36 Containing Diels-Alder Adduct of Tung Oil and Maleic Anhydride The polyol in Example 36 was also evaluated in rigid PIR foam according to the formulation in Table 3. Foam performance properties, including reactivity, green strength, parallel compressive strength, and k factor, are listed in Table 10.

TABLE 10

Physical properties of foam from polyol in example 36

| | Polyol | |
|---|---|---|
| | A | from example 36 |
| Index | 260 | 260 |
| Reactivity (gel time, s) | 28 | 26 |
| Cup Density (PCF) | 1.61 | 1.67 |
| Initial Core K factor (Btu · in/Ft2 · hr · F.) | 0.1525 | 0.1463 |
| Emulsion Stability | 3-4 hours | >10 days |
| Green Strength @ 2 min (psi) | 8.8 | 11.6 |
| parallel compressive (Psi) | 28.9 | 32.0 |

From Table 10, it can be seen that the polyol containing the Diels-Alder adduct of Tung oil and Maleic Anhydride showed improved strength and insulation properties as well as better emulsion stability compared to Polyol A.

Example 38

Evaluation of Polyols Containing Diels-Alder Adduct of Farnesene and Maleic Anhydride in CASE Applications, Specifically as a Pigment Dispersion Agent in a Coating Formulation The polyol from Example 32 was formulated into a pigment dispersion comprising 25% by weight SUNFAST® Blue 15:4 pigment without any pigment dispersion agent. The pigment dispersion was evaluated for surface tension, yield stress, and pigment dispersibility, compared to a commercial polyol, Stepanpol PC-270-01 having 9.9 mgKOH/g AV, 257 mgKOH/g OHV and 2195 cP viscosity @ 25 C, as a control resin. In general, the pigment dispersions are prepared by mixing the polyol and pigment together. Three-roll milling after mixing thoroughly distributes and wets the pigment powder. The results are shown in Table 11.

TABLE 11

Pigment dispersion evaluation

| Resins Used | Farnesene content % | Surface tension (dynes/cm) | Yield Stress (Pa) | Dispersibility (NPIRI) |
|---|---|---|---|---|
| STEPANPOL ® PC-270-01 | 0 | 34.2 | 54 | 7.5 |
| From Example 32 | 50 | 31.33 | 18 | 5.0 |

The results in Table 11 illustrate that just adding more farnesene into the polyol lowers the surface tension, resulting in a better pigment dispersibility and lower yield stress. In general, it is desirable for the pigment dispersion to have a yield stress of less than 650 Pa, alternatively less than about 400 Pa, alternatively less than about 200 Pa, alternatively less than about 50 Pa.

Apart from lowering the surface tension, the higher farnesene content helps to improve rheological behavior of the pigment dispersions. The plastic viscosity is more stable than that of a formulation with lower farnesene content and the delta value is much higher than the control. It is much closer to Newtonian behavior.

The following examples 39-41 illustrate the preparation of polyester polyols for use in elastomers.

Example 39

Adipic acid (413 g), ethylene glycol (146 g), 1,4-butanediol (142 g) and Adduct 1 (213 g) are charged into a 1-L flask and heated to 180-220° C. under N2 for about 15 h. TnBT (0.16 g) is added when the formation of a condensate becomes slow. The product is a yellow viscous liquid having an AV of 1.0 mg KOH/g, and an OHv of 56 mg KOH/g.

Example 40

Adipic acid (516 g), ethylene glycol (183 g), 1,4-butanediol (155 g), 2-methyl 1,3-propanediol (22 g), and Adduct 1 (267 g) are charged into a 2-L flask and heated to 180-220° C. under N2 for about 15 h. TnBT (0.2 g) is added when the formation of a condensate becomes slow. The product is a yellow viscous liquid having an AV of 1.0 mg KOH/g and an OHv of 56 mg KOH/g, and an average molecular weight of about 2000.

Example 41

Adipic acid (496 g), ethylene glycol (195 g), 1,4-butanediol (166 g), 2-methyl 1,3-propanediol (24 g), and Adduct 1 (257 g) are charged into a 2-L flask and heated to 180-220° C. under N2 for about 15 h. TnBT (0.2 g) is added when the formation of a condensate becomes slow. The product is a yellow viscous liquid having an AV of 1.0 mg KOH/g, and an OHv of 112 mg KOH/g, and an average molecular weight of about 1000.

Example 42

Polyol for Coating Application

PA (54 g), Adduct 9 (315 g), PEG-200 (715 g) were charged into a 5 L flask and agitated under N2 for about 16 hours at 210-230° C. TnBT (0.5 g) was added when the temperature reached 212° C. An amber liquid (1001 g) was formed having an AV of 1.5 mg KOH/g, OHv of 244 mg KOH/g, and viscosity of 940 cps at 25° C.

The following examples illustrate polyols made for rigid polyurethane foam applications. These differ from the Polyisocyanurate foam applications in that the index is typically 100-160. Some of the applications are PUR sprayfoam, pour in place PUR foam panels, and pour in place PUR foam appliances.

Example 43

237 g Terephthalic acid, 108 g Adduct 1, 290 g DEG and 23 g Glycerine were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target number. This yielded a polyol with OHV=258 mg KOH/g, AV=0.4 mg KOH/g, viscosity of 19840 cP @ 25 C, and functionality of 2.2.

Example 44

152 g Terephthalic acid, 118 g Adduct 1, 246 g DEG and 24 g Glycerine were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target number. This yielded a polyol with OHV=311 mg KOH/g, AV=1.3 mg KOH/g, viscosity of 4326 cP @ 25 C, and functionality of 2.2.

Example 45

229 g Terephthalic acid, 31 g Phthalic Anhydride, 156 g Adduct 9 and 444 g DEG were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target number. This yielded a polyol with OHV=317 mg KOH/g, AV=1.5 mg KOH/g, viscosity of 3440 cP @ 25 C, and functionality of 2.2.

Example 46

250 g Terephthalic acid, 138 g Adduct 9 and 201 g DEG and 171 g 2-methyl-1,3-propanediol were charged to a reactor affixed with mechanical stirring, nitrogen inlet, packed column, condenser with receiver, and temperature control and then heated to 230° C. under nitrogen sparge. When the AV was 3 or below, a transition metal catalyst was added. When the AV was about 1, the OHV was measured and adjusted with DEG to get the target number. This yielded a polyol with OHV=305 mg KOH/g, AV=1.0 mg KOH/g, viscosity of 13653 cP @ 25 C, and functionality of 2.2.

Example 47

Polyurethane Foam in Appliance Application

The polyol in Example 2 was also evaluated in a rigid PUR foam against a control formulation containing Polyol A. The foam formulations and foam performance, including green strength and k factor, are listed in table 12.

TABLE 12

Physical properties of foam from polyol in example 2

| Polyester polyol used | A | from example 2 |
|---|---|---|
| Formulation | | |
| Polyether Voranol ® 800 | 10 | 10 |
| Polyether Multranol ® 4034 | 48.8 | 48.8 |
| Polyester polyol | 20 | 20 |
| Water | 1 | 1 |
| Tegostab ® B-8465 | 2.5 | 2.5 |
| Niax ® A-1 | 0.2 | 0.2 |
| Polycat ® 8 | 0.5 | 0.5 |
| Curithane ® 52 | 1 | 1 |
| Cyclopentane | 16 | 16 |
| Mondur ® MR light | 108 | 108 |
| Foam properties | | |
| Cup Density (PCF) | 1.51 | 1.51 |
| Initial Core K factor (Btu · in/Ft2 · hr · F) | 0.152 | 0.150 |
| Green Strength @ 3 min (psi) | 8.14 | 8.50 |

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further the examples are provided to not be exhaustive but illustrative of several embodiments that fall within the scope of the claims.

What is claimed is:

1. A foam forming composition comprising at least one diisocyanate component, at least one polyisocyanate component, or mixtures thereof, and at least one polyester polyol component comprising the esterification reaction product of:
    (a) at least one aromatic acid based material, or at least one aliphatic carboxylic acid based material, or mixtures thereof;
    (b) at least one hydroxylated material; and
    (c) at least one adduct formed by a Diels-Alder reaction of farnesene or myrcene reacted with a dienophile selected from the group consisting of maleic anhydride, maleic acid, itaconic anhydride, and itaconic acid.

2. The foam forming composition of claim 1, further comprising at least one nonionic surfactant.

3. The foam forming composition of claim 1, further comprising flame retardants, silicon surfactants, catalysts, blowing agents, or mixtures thereof.

4. The foam forming composition of claim 1, wherein the polyester polyol component has an OH value of from 30 to 400 mg KOH/g.

5. The foam forming composition of claim 1, wherein the aromatic acid based material is selected from the group consisting of: phthalic acid, terephthalic acid, isophthalic acid, phthalic anhydride, pyromellitic anhydride, dimethyl terephthalate, dimethyl phthalate, dimethyl isophthalate, polyethylene terephthalate, benzoic acid, methyl benzoate, methyl toluate, toluic acid, 2,5-furandicarboxylic acid, trimellitic anhydride, derivatives thereof, and combinations thereof.

6. The foam forming composition of claim 1, wherein the hydroxylated material is selected from the group consisting of aliphatic diols, poly(oxyalkylene) polyols derived by the condensation of ethylene oxide, propylene oxide, or any combination thereof, glycerol, trimethylolpropane, pentaerythritol, 1,18-octadecane diol, and combinations thereof.

7. The foam forming composition of claim 1, wherein the polyester polyol component has an Acid Value of less than 4 mg KOH/g.

\* \* \* \* \*